June 5, 1962  S. B. ALCORIZA  3,037,356
STANDPIPE UNIT FOR IRRIGATION WATER CONTROL
Filed Dec. 14, 1959  2 Sheets-Sheet 1

INVENTOR.
Sofronio B. Alcoriza
BY
Webster & Webster
ATTYS.

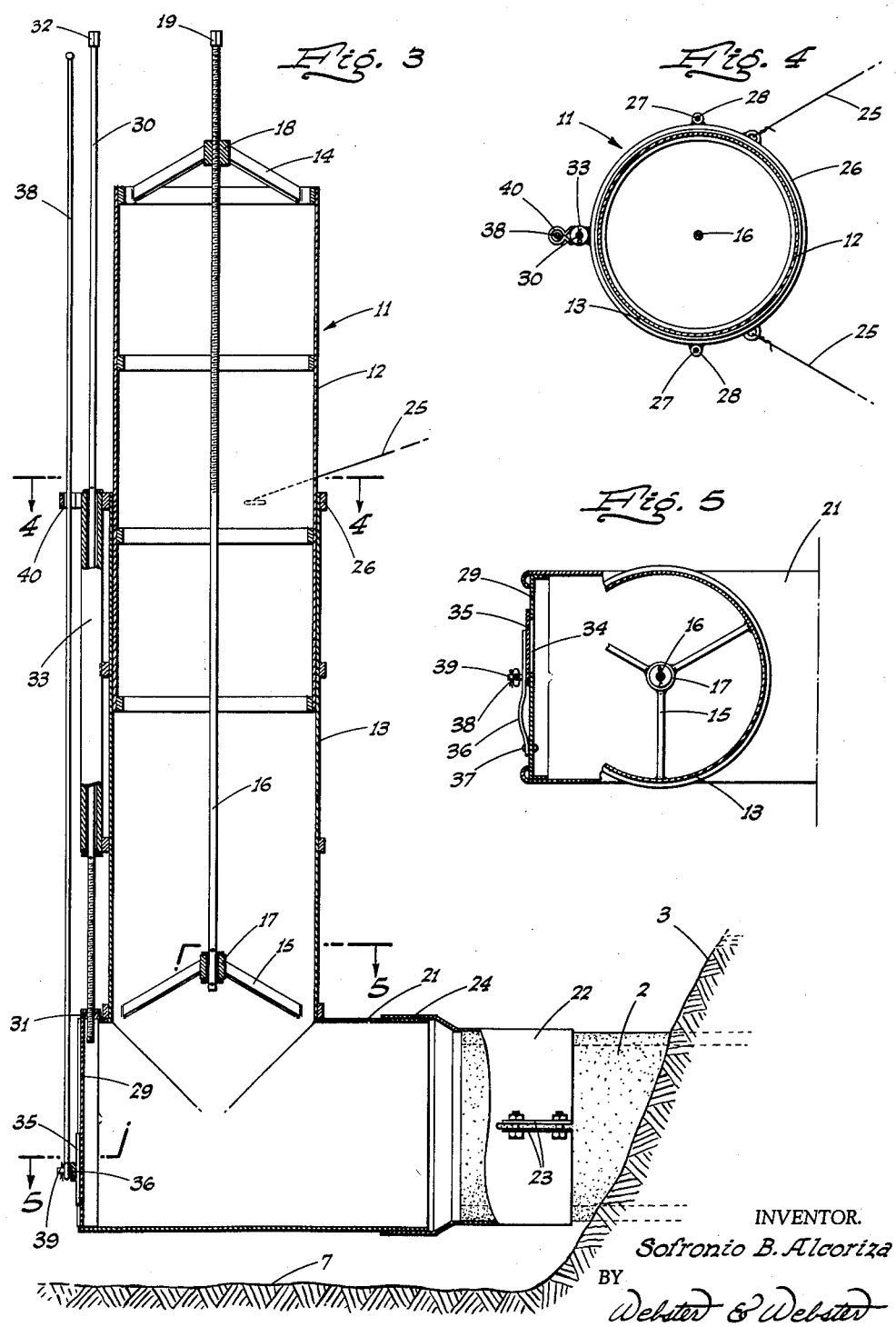

United States Patent Office 3,037,356
Patented June 5, 1962

3,037,356
STANDPIPE UNIT FOR IRRIGATION
WATER CONTROL
Sofronio B. Alcoriza, P.O. Box 397, Walnut Grove, Calif.
Filed Dec. 14, 1959, Ser. No. 859,474
5 Claims. (Cl. 61—12)

This invention relates in general to a device for the control of irrigation water.

In particular the invention is directed to, and it is a major object to provide, a manually adjustable standpipe unit adapted for connection to the intake end of a culvert pipe which normally feeds water from one ditch to another; the primary purpose of the device being to cause the water in said one ditch to rise to—and remain at—a level sufficiently high to flow into shallower but communicating, laterally extending, irrigation furrows formed in the surrounding field between adjacent crop rows.

Another important object of the present invention is to provide a standpipe unit, as in the preceding paragraph, which includes a manually operated valve which can be opened partially or wholly to permit of regulated or free flow, respectively, of the water through the culvert pipe from said one ditch to the other, and irrespective of the vertical adjustment of such standpipe unit.

An additional object of the invention is to provide a standpipe unit which is designed for ease and economy of manufacture, ready installation, and convenience of use.

It is also an object of the invention to provide a practical, reliable, and durable standpipe unit for irrigation water control, and one which will be exceedingly effective for the purpose for which it is designed.

These objects are accomplished by means of such structure and relative arrangement of parts as will fully appear by a perusal of the following specification and claims.

In the drawings:

FIG. 3 is an enlarged vertical sectional elevation of the standpipe unit; the view being taken on line 3—3 of FIG. 2.

FIG. 4 is a fragmentary sectional plan view taken on line 4—4 of FIG. 3.

FIG. 5 is a fragmentary sectional plan view taken on line 5—5 of FIG. 3.

Figure 1:
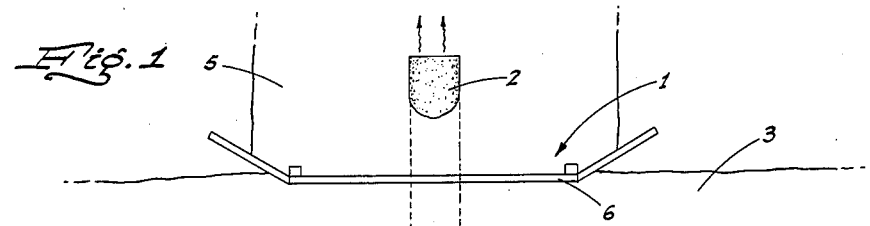
FIG. 1 is a top plan view of the standpipe unit as mounted on the intake end of a culvert pipe.
Figure 2:
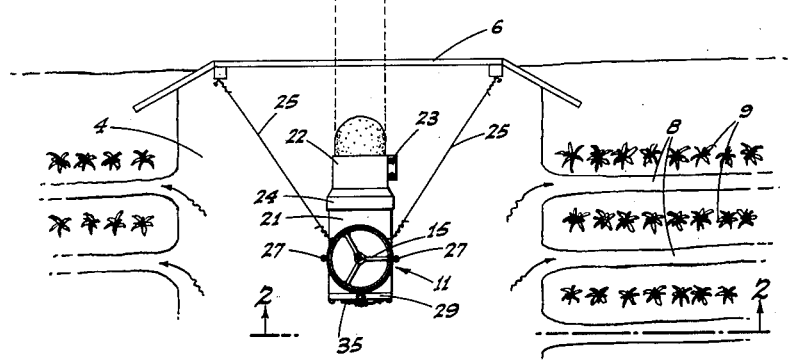
FIG. 2 is an enlarged elevation of the standpipe unit mounted as in FIG. 1; the view being taken from beyond said unit and looking in the direction of the culvert.
Figure 2:
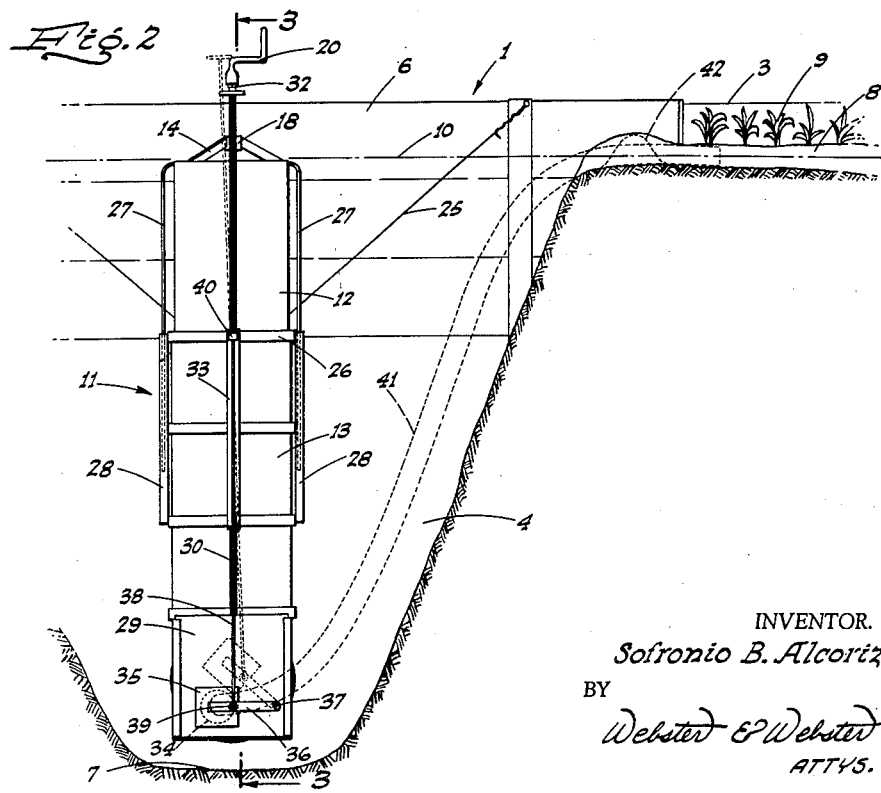

Referring now more particularly to the drawings, and to the characters of reference marked thereon, the numeral 1 indicates generally a culvert; the latter including a horizontal pipe 2 which extends transversely through the levee 3 between a ditch 4 and a ditch 5. Additionally, the culvert 1 includes the usual head boards 6, or the like.

The ditch 4 normally delivers water through the culvert pipe 2 into the ditch 5; the intake end of said pipe 2 being closely adjacent but slightly above the bottom 7 of said ditch 4.

The agricultural field along opposite sides of the ditch 4 is formed with a multiplicity of shallow irrigation furrows 8 which extend laterally from said ditch 4 between crop rows 9. As the bottom of the irrigation furrows 8 communicate with the ditch 4 closely adjacent the top of the latter, it is necessary to raise the water in such ditch to substantially the level indicated at 10 before the water will flow into and along the irrigation furrows 8. This is accomplished by employing the novel standpipe unit which is the subject of the present invention, and which is constructed, mounted, and used in the following manner;

A sectional, vertically adjustable standpipe 11 is disposed in an upstanding position in ditch 4 adjacent the exposed intake end portion of the pipe 2; such standpipe 11 including an upper pipe section 12 and a lower pipe section 13 in telescopic relation. The lower pipe section 13 is fixedly supported in the manner hereinafter described, while the upper pipe section 12 is slidable in said section 13; vertical adjustment of the section 12 being accomplished as follows:

An upper spider 14 is secured in the top of pipe section 12, while a lower spider 15 is secured in the bottom of pipe section 13; said spiders being connected by a central internal shaft 16. At its lower end the shaft 16 is rotatably but axially non-displaceably journaled in the hub 17 of spider 5, while the upper end of said shaft threadingly extends through the hub 18 of spider 14; the shaft 16 extending some distance above hub 18, and at its upper end such shaft is formed with a non-circular head 19 adapted for reception of a detachable crank 20.

By rotating the shaft 16 through the medium of the crank 20, the upper pipe section 12 can be readily and selectively adjusted upwardly or downwardly, selectively.

At the bottom thereof the pipe section 13 is mounted on and in communication with a relatively short horizontal pipe section 21 disposed in axial alinement with the intake end of the pipe 2; such intake end of pipe 2 being fitted with a coupling 22 secured in place by a clamp 23. Additionally, the coupling 22, at its outer or free end, is formed as a bell 24 in which the adjacent end of the horizontal pipe section 21 engages with a close frictional fit; the engaged parts—if desired—being secured together by any single means, such as screws (not shown).

In order to stabilize the upstanding, vertically adjustable standpipe 11, stay wires 25 (or rods if preferred) are connected to a top band 26 on pipe section 13, and thence diverge to and are connected with the adjacent head board 6 of the culvert 1.

In order to prevent the upper pipe section 12 from rotating in the lower pipe section 13, opposed external guide rods 27 are fixed on said section 13 exteriorly thereof and in parallel relation; said guide rods running in corresponding guide pipes 28 on the outside of section 12.

At the end opposite the coupling 22 the horizontal pipe section 21 is provided with a vertically slidable, normally closed gate valve 29; said valve 29 being opened and closed by means of the following:

A vertical external shaft 30 is threaded at its lower end through a nut 31 secured centrally on the top of the valve 29, and such shaft 30 thence extends upwardly to a top termination above the standpipe 11; there being a non-circular head 32 on the upper end of said shaft 30 and adapted for reception of the same crank 20 which fits the head 19 of the internal shaft 16.

Intermediate its ends, and alongside the lower pipe section 13, the shaft 30 extends through a guide sleeve 33 attached to said section 13; the shaft 30 being turnable but axially non-displaceable in said sleeve 33. By applying the crank 20 to the head 32 and rotating the shaft 30 in one direction or the other, the gate valve 29 is opened or closed, as desired.

The gate valve 29 is formed, adjacent the lower end thereof, with a port 34 normally closed by a small, vertically swingably gate valve 35 which includes a laterally or normally horizontally projecting mounting arm 36 pivoted to the face of valve 29, as at 37.

A vertical push-pull rod 38 parallels the shaft 30 laterally out from the same, and such rod 38 is pivoted at its lower end, as at 39, to the arm 36, and intermediate its ends said rod passes in loose-play relation through a guide 40. By pulling upwardly on the rod 38 the small gate valve 35 is swung upwardly to an open position;

i.e., to a position which exposes the port 34 for the purpose hereinafter described.

In use of the above described standpipe unit, the gate valve 29 and the smaller gate valve 35 thereon are normally closed, and the upper pipe section 12 is adjusted so that its open top lies in a horizontal plane slightly above the bottom of the irrigation furrows 8. The water in the ditch 4 is thus caused to rise to such level before it can escape into the open upper end of the standpipe 11. As a consequence, and when the water in ditch 4 reaches such level it flows into all of the irrigation furrows 8 for the purpose of irrigating the crop rows 9; the excess water spilling into the standpipe 11, and thence flowing downward therein and out through the transverse pipe 2.

If at any time the water level in any given one of the irrigation furrows 8 becomes too high, a drain hose 41 is laid in such furrow adjacent the ditch 4 and dammed, as at 42. The drain hose thence extends into the ditch 4 and is inserted through the port 34 after opening the small gate valve 35. Because of the fact that the flow in the standpipe 11 is away from the port 34 when open—i.e. in the direction of the pipe 2—excess water will deliver from the irrigation furrow 8, through the drain hose 41, and into the horizontal pipe section 21.

However, as previously indicated, the small gate valve 35 is normally closed, as is the larger or main gate valve 29.

Under conditions wherein it is desired to feed water, either regulated or full-head, directly from the ditch 4 into the ditch 5 and irrespective of the adjusted position of the standpipe 11, the main gate 29 is opened to the extent necessary.

As the standpipe unit is in the main constructed of sheet metal, and otherwise of relatively light parts, the entire device can be readily transported and easily installed.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In the combination of a pipe having an intake end portion exposed in a ditch, and a standpipe unit; the unit including a lower section and a vertically adjustable upper section engaged in telescopic relation with the lower section, means coupling the lower section at the bottom thereof in rigid relation and in communication with the exposed end portion of the pipe, valve means normally closing the intake end of the pipe and operable to an open position, and mechanism on the standpipe connecting the sections and manually operative to vertically adjust said upper section.

2. In the combination of a pipe having an intake end portion exposed in a ditch, and a standpipe unit; the unit including a lower section and a vertically adjustable upper section engaged in telescopic relation with the lower section, means coupling the lower section at the bottom thereof on and in communication with the exposed end portion of the pipe, valve means normally closing the intake end of the pipe and operable to an open position, and mechanism on the standpipe manually operative to vertically adjust said upper section; said mechanism including upper and lower spiders fixed in corresponding sections, a central hub in each spider, a shaft extending centrally in the standpipe, journaled in the hub of the lower spider and axially immovable relative thereto, and threaded through the hub of the upper spider; the shaft projecting above the top of the standpipe, and hand means to rotate the shaft from the top thereof.

3. In the combination of a pipe having an intake end portion exposed in a ditch, and a standpipe unit; the unit including a lower section and a vertically adjustable upper section engaged in telescopic relation, means coupling the lower section at the bottom thereof on and in communication with the exposed end portion of the pipe in rigid relation therewith, mechanism on the standpipe manually operative to vertically adjust said upper section, a valve mounted in unitary connection with the lower section and adapted when open to establish communication between the ditch and said end portion of the pipe independently of the standpipe, and other mechanism on the standpipe connected to and manually operative to open and close said valve.

4. In the combination of a pipe having an intake end portion exposed in a ditch, and a standpipe unit; the unit including a lower section and a vertically adjustable section engaged in telescopic relation, a horizontal pipe section secured on and projecting diametrally of said lower section at the bottom thereof in free communication intermediate its ends therewith, a valve normally closing one end of the horizontal pipe section, means connecting the other end of said horizontal pipe section to and in communication with the exposed end portion of the pipe, and mechanisms on the standpipe operative to vertically adjust said upper section and to open and close said valve, from above the standpipe, selectively and independently; said valve being vertically slidable, and said mechanisms include a pair of screw shafts, one shaft corresponding to and being operative to raise and lower the upper section, and the other shaft corresponding to and being operative to raise and lower the valve; both said shafts including portions adjacent the top of the standpipe, and hand means to rotate said shafts from the upper end thereof.

5. A standpipe unit, as in claim 4, in which said valve is formed with a relatively small port therethrough, another valve mounted on said first named valve and normally closing the port, and another mechanism to open and close said other valve; all of said mechanisms being operative from adjacent the top of the standpipe.

References Cited in the file of this patent

UNITED STATES PATENTS

| 337,819 | Dill | Mar. 16, 1886 |
| 550,711 | Eads | Dec. 3, 1895 |
| 694,866 | Kaschewitz | Mar. 4, 1902 |
| 956,126 | Merrill | Apr. 26, 1910 |
| 1,046,599 | Jones | Dec. 10, 1912 |
| 1,200,869 | Rife | Oct. 10, 1916 |
| 1,241,916 | Brown | Oct. 2, 1917 |
| 1,281,008 | Howard | Oct. 8, 1918 |
| 1,336,048 | Rice | Apr. 6, 1920 |
| 1,921,125 | Hughes et al. | Aug. 8, 1933 |
| 2,625,175 | Wilson | Jan. 13, 1953 |
| 2,881,788 | Johnson | Apr. 14, 1959 |
| 2,896,904 | Northup | July 28, 1959 |

FOREIGN PATENTS

| 21,972 | Great Britain | Sept. 22, 1910 |